United States Patent
Gallup et al.

(10) Patent No.: US 6,955,480 B2
(45) Date of Patent: Oct. 18, 2005

(54) ACTIVELY ALIGNED OPTOELECTRONIC DEVICE

(75) Inventors: Kendra Gallup, Sunnyvale, CA (US); Frank Flens, Campbell, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 300 days.

(21) Appl. No.: 10/174,002

(22) Filed: Jun. 17, 2002

(65) Prior Publication Data

US 2004/0005124 A1    Jan. 8, 2004

(51) Int. Cl.[7] ............ G02B 6/32; G02B 6/36; G02B 6/42; G02B 6/43
(52) U.S. Cl. ............ 385/88; 385/52; 385/90; 385/93; 385/49
(58) Field of Search ............ 385/88, 90, 93, 385/52, 49

(56) References Cited

U.S. PATENT DOCUMENTS

| | | | |
|---|---|---|---|
| 5,550,942 A * | 8/1996 | Sheem | 385/53 |
| 5,768,456 A | 6/1998 | Knapp et al. | |
| 5,933,558 A | 8/1999 | Sauvageau et al. | |
| 5,940,562 A | 8/1999 | Henson et al. | |
| 6,056,448 A * | 5/2000 | Sauter et al. | 385/92 |
| 6,318,909 B1 | 11/2001 | Giboney et al. | |
| 6,676,302 B2 * | 1/2004 | Cheng et al. | 385/88 |
| 6,733,188 B2 * | 5/2004 | Brezina et al. | 385/91 |
| 6,736,553 B1 * | 5/2004 | Stiehl et al. | 385/89 |
| 6,741,778 B1 * | 5/2004 | Chan et al. | 385/52 |
| 6,848,840 B2 * | 2/2005 | Tourne | 385/88 |
| 6,874,952 B2 * | 4/2005 | Nishimura | 385/89 |
| 2003/0113071 A1 * | 6/2003 | Kim et al. | 385/76 |

FOREIGN PATENT DOCUMENTS

JP        63085522 A  *  4/1988  .......... G02B 26/08

* cited by examiner

*Primary Examiner*—Edward J. Glick
*Assistant Examiner*—Krystyna Suchecki (57) ABSTRACT

An optoelectronic device is provided having an active alignment. The lens and the optoelectronic device are mounted on their respective carrying members, and the carrying members are placed proximate to each other in a loose alignment controlled by alignment pins loosely engaging oversized alignment opening. An alignment range is created by a difference in the diameter of the alignment pins and the alignment opening, allowing the lens and optoelectronic device to be moved with respect to each other and actively aligned. The member carrying the lens may also include a connector stop cooperatively arranged with the alignment pins to provide an aligned coupling between an optical fiber connector and the optoelectronic component.

18 Claims, 5 Drawing Sheets

ACTIVELY ALIGNED OPTOELECTRONIC DEVICE

FIELD OF THE INVENTION

The invention generally relates to fiber optic communication systems, and more particularly to an actively aligned optoelectronic component that optimize the optical coupling between an optoelectronic device and optical fibers in a fiber optic communication system.

BACKGROUND

Fiber optic systems are commonly used for transmitting bits of data information. Because there are no practical optical computers, the bits of data information typically exist as electrical signals that are converted to optical (light) signals for transmission over optical fibers, and then converted from optical signals back to electronic signals for processing of the transmitted information. An optoelectronic light source converts an electrical signal to an optical signal that is then coupled to an optical fiber for transmission. The optical signal is decoupled from the optical fiber and received by an optoelectronic light detector for reverse conversion back to an electrical signal. In fiber optic systems, the optoelectronic light sources are typically vertical cavity surface emitting lasers (VCSEL) or light emitting diodes, and the optoelectronic light detectors are typically photo-intrinsic diodes (PINS) or avalanche photodiodes.

In a typical optical fiber based optical communication systems, an optoelectronic device having one or more components (i.e., light sources or light detectors) transmits optical signals to, or receives optical signals from, one or more optical fibers. The optical fibers are mounted in a fiber optic connector that positions the ends of the optical fibers in close proximity to the optoelectronic component. A lens is placed between the fibers and the components to focus light into or from the optical fibers. When transmitting, the optoelectronic device converts electrical signals into optical signals and directs the optical signals into the optical fibers. When receiving, the optoelectronic device receives the optical signals from the optical fibers and converts the optical signals into electrical signals.

To provide optimum transfer of an optical signal to or optimum reception of an optical signal from an optical fiber, the optoelectronic component must be precisely aligned in three dimensions relative to the lens, and the combination of the component and the lens must be precisely aligned in three dimensions relative to the end of the optical fiber. If the optical transmission path is not precisely aligned, the quality of the optical communication can be significantly degraded. The core of the optical fiber has cross-sectional dimensions in the order of a few microns to a few hundred microns, and the lens and the optoelectronic device elements have similar cross-sectional dimensions. Precisely aligning the optoelectronic device, the lens, and the core of the optical fiber can be difficult because of the small dimensions.

Therefore, an important step in building fiber optic transmitting and receiving modules for optical communication systems is aligning the optoelectronic component having an array of emitting surfaces with the lens array for optimal light transmission to and from the optical fibers. This alignment is on the three linear axes and a rotational axis to properly focus the light and align the optical paths between the multiple emitting (or receiving) surfaces and the multiple optical fibers to maximize signal strength.

Although devices and methods exist that are capable of achieving the required alignment precision in the range of several microns, such devices typically suffer from one or more shortcomings. The shortcomings typically involve passively aligning the components by individually assembling them in precisely defined positional relationships, with very close tolerances for each position. For example, the positional tolerance for the lens array is about five microns. In addition, multiple steps are often required to provide the required precision, and these steps often cannot be fully automated. If upon final assembly it is discovered that the components are not precisely aligned, the entire module must be discarded because the alignment typically cannot be adjusted once the components are assembled.

In view of the foregoing, there is a need for a simple, low-cost optoelectronic module and method of producing the same that allows an active alignment between the optoelectronic device, the lens array, and the optical fibers.

SUMMARY

An optoelectronic device providing active alignment is provided by an embodiment of the invention. The device includes an alignment member having a lens-mounting portion, a first mating surface, and a plurality of alignment pins, each pin having at least one diameter, and the centers of the alignment pins being separated by a predetermined distance, and a carrying member having an optoelectronic component mounting portion, a second mating surface, and a plurality of alignment openings, each opening having at least one alignment opening diameter and further being arranged to correspond with an alignment pin, the centers of the openings being separated by the predetermined distance, and each opening diameter being greater than the pin diameter of the pin with which the opening corresponds. The active alignment range is provided by the difference between the opening diameter and the pin diameter of the pin with which the opening corresponds, the diameter difference being selected such that when the first mating surface is proximate to the second mating surface, and when the alignment pins are positioned within their corresponding alignment openings, a lens mounted on the alignment member and an optoelectronic component mounted on the carrying member can be moved relative to each other into an alignment.

The alignment member may also include a connector stop cooperatively arranged with a portion of the first and second alignment pins to provide an aligned coupling between a connector having at least one optical fiber and the optoelectronic component. The alignment of the aligned coupling in the plane perpendicular to an optical path between the lens and the optical fiber is provided by the alignment pins, and alignment of the aligned coupling in the direction of the optical path is provided by the connector stop.

The active alignment range allows the lens and the optoelectronic device to be individually mounted to their respective carrying members with significantly less precision than is required for passively aligned devices. The lens and the optoelectronic device are mounted in their respective carrying members, and the carrying members are placed proximate to each other in a loose alignment controlled by the undersized alignment pins loosely engaging the alignment opening. An alignment range is created by the difference in diameters, allowing the lens and optoelectronic device to be moved with respect to each other and actively aligned.

These and various other features as well as advantages which characterize the present invention will be apparent from a reading of the following detailed description and a review of the associated drawings.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like referenced numerals identify like elements, and wherein:

DETAILED DESCRIPTION

In the following detailed description of exemplary embodiments of the invention, reference is made to the accompanying drawings, which form a part hereof. The detailed description and the drawings illustrate specific exemplary embodiments by which the invention may be practiced. These embodiments are described in sufficient detail to enable those skilled in the art to practice the invention. It is understood that other embodiments may be utilized, and other changes may be made, without departing from the spirit or scope of the present invention. The following detailed description is therefore not to be taken in a limiting sense, and the scope of the present invention is defined only by the appended claims.

Throughout the specification and claims, the following terms take the meanings explicitly associated herein unless the context dictates otherwise. The term "connected" means a direct electrical or optical connection between the things that are connected, without any intermediary devices. The term "coupled" means either a direct electrical or optical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal, light signal, or data signal. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

Briefly stated, an optoelectronic device is provided having an active alignment range by an embodiment of the invention. A lens and an optoelectronic device are mounted on respective carrying members, and the carrying members are placed proximate to each other in a loose alignment controlled by undersized alignment pins, each loosely engaging a corresponding alignment opening. An alignment range is created by the undersizing, allowing the lens and optoelectronic devices to be moved with respect to each other and actively aligned.

Figure 1:
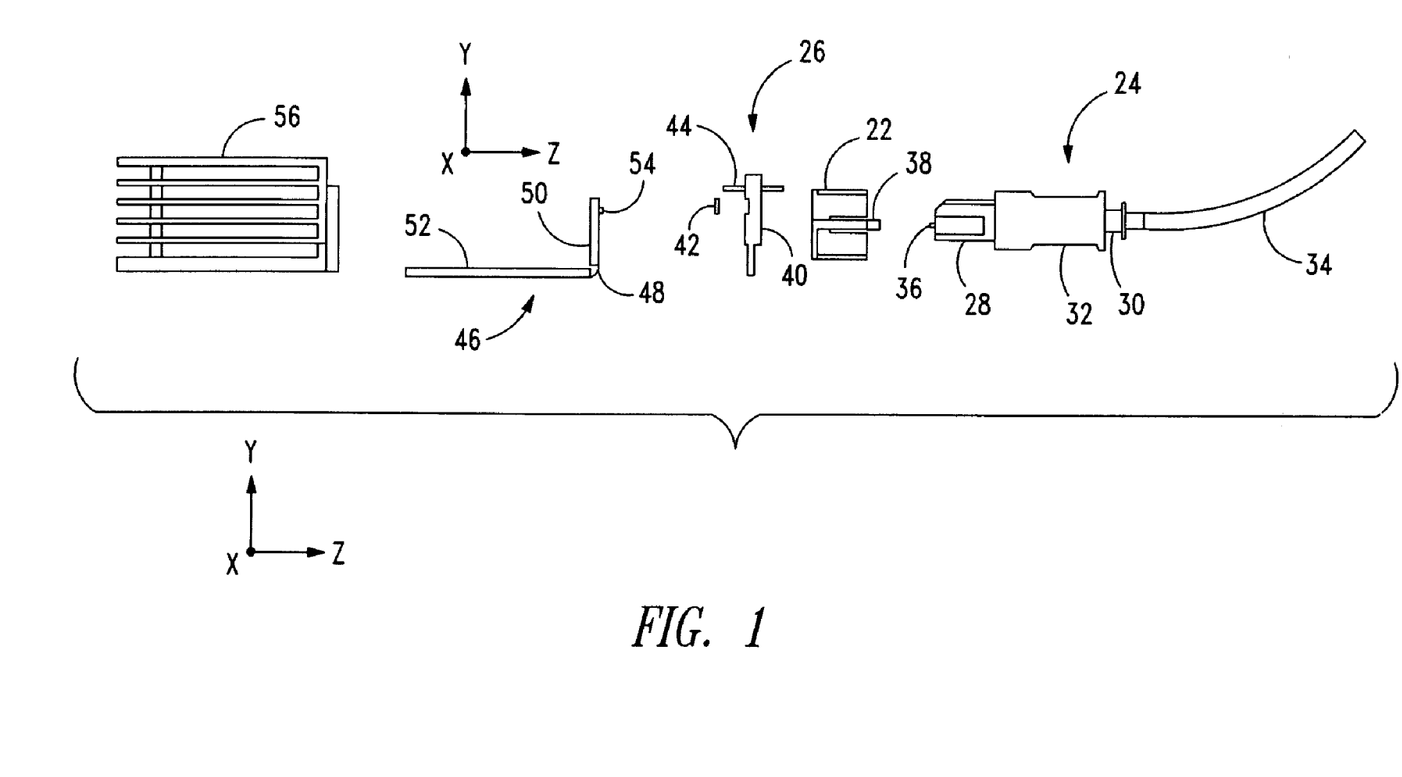
FIG. 1 is an exploded view of an optical communication system according to an embodiment of the invention.

FIG. 1 is an exploded view of an optical communication system 20 according to an embodiment of the invention. The system 20 includes a receptacle 22 that releasably locks to both a connector 24 and an alignment member 26. The configuration of the receptacle 22 depends on the type of connector. In one embodiment, the connector 24 is a twelve-channel optic fiber Mechanical Transfer Plug array connector (MTP), sometimes known as a Mechanically Transferable Plug. Such a connector 24 includes a mating end 28, a cable entry end 30, and a spring-biased body 32. A fiber cable 34 enters the connector 24 and the ends of the individual fibers are exposed at a ferrule 36. When the spring-biased body 32 of the connector 24 is moved rearwardly relative to the mating end 28, indentations are exposed which mate with latches 38 of the receptacle 22. Thus, the connector 24 is locked into position within the receptacle 22 by operation of the latches. As a result, the Z-axis position of the ferrule 36 is controlled by physical contact between the receptacle 22 and a connector stop 40 located on a surface of the alignment member 26.

As will be explained more fully below, a lens array 42 is mounted on the alignment member 26. The lens array 42 includes a number of optical elements that corresponds to the number of optical fibers exposed at the ferrule 36 of the connector 24. When the system 20 is fully assembled, the fibers are optically aligned with the lenses of lens array 42. As will also be more fully explained below, the alignment of the lens array 42 along the Z-axis (the optical transmission pathway) has a precisely defined positional relationship established by the alignment member 26. An alignment pin 44 is rigidly attached to the alignment member 26 for engaging with alignment openings (not shown) in the ferrule 36 and the carrying member 46. While only one alignment pin 44 is shown, there are typically at least two pins.

The carrying member 46 is a substrate that includes a flex circuit assembly 48 and a pair of mechanical supports 50 and 52 that provide support for the flex-circuit assembly 48. The carrying member 46 is illustrated in an "L" configuration, with a horizontal portion (represented by support 52) for coupling to the electronics (not shown) of the system 20, and a vertical portion (represented by support 50) for coupling to the optical fibers of the fiber cable 32. A heat sink 56 is thermally coupled to the vertical and horizontal mechanical supports 50 and 52. The function of the heat sink 56 is to maintain the IC's and optoelectronic components mounted on the flex-circuit assembly 48 at a desired operating temperature.

Figure 2:
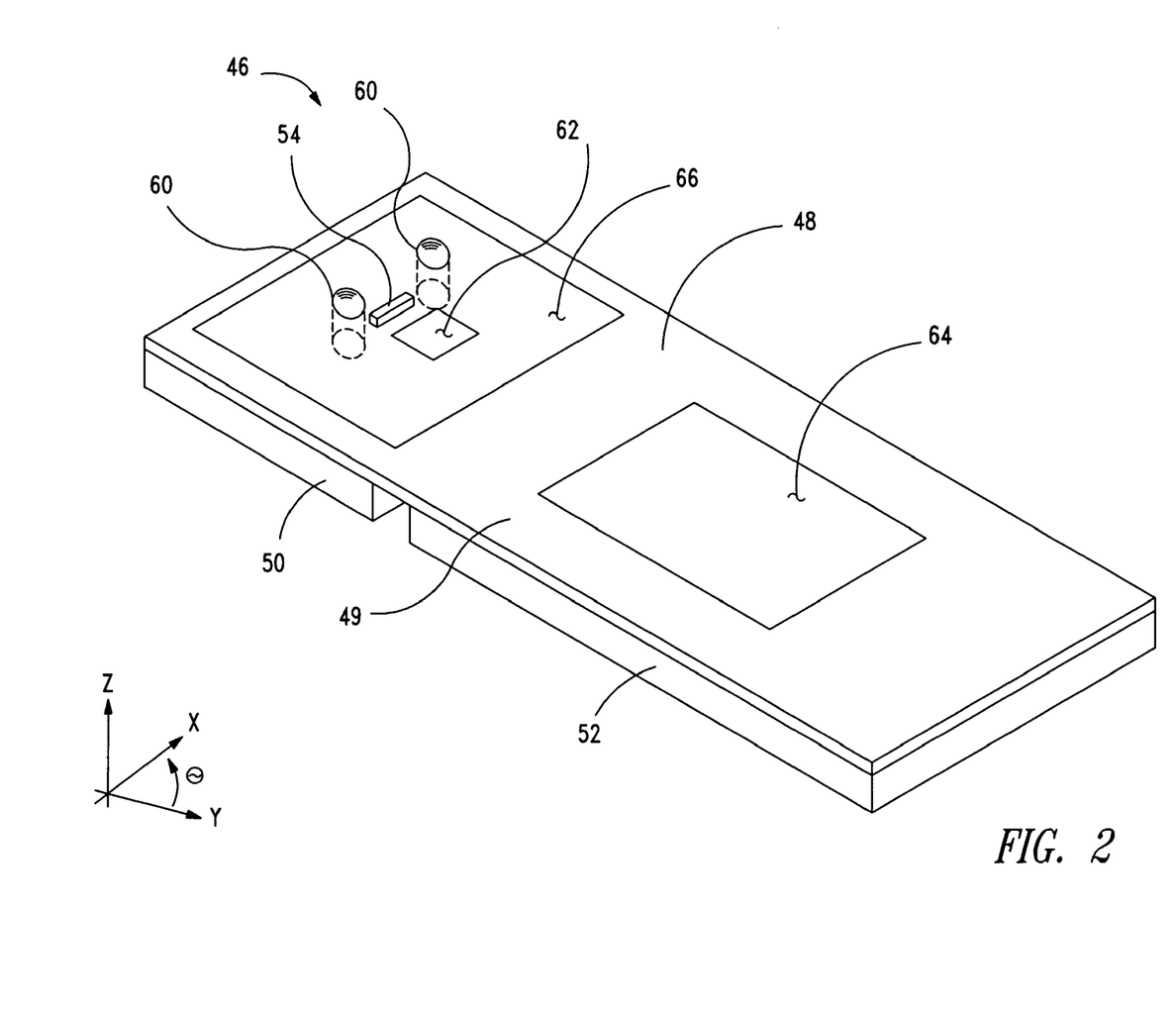
FIG. 2 is an view of the carrying member of FIG. 1 according to an embodiment of the invention.

FIG. 2 is a perspective view of the carrying member 46 of FIG. 1 according to an embodiment of the invention. The carrying member 46 includes the flex-circuit assembly 48, the mechanical supports 50 and 52, the optoelectronic component 54, a plurality of alignment openings 60, an electronics mounting area 62, a motherboard mounting area 64, and a carrying member mating surface 66. (The carrying member 46 is in a flat configuration as illustrated for assembly, and is shaped into the "L" configuration of FIG. 1 for integration into the optical communication system 20 of FIG. 1.)

For simplicity, the carrying member 46 and the flex-circuit assembly 48 of the optical communications system 20 may be described in further detail below using an example in which the optoelectronic component 54 receives optical signals from the fiber cable 34. However, the optical communications system 20 is not limited to an optoelectronic component 54 that receives optical signals. The optical communications system 20 can be used with an optoelectronic component 54 that transmits optical signals to the optical fibers of fiber cable 34, or that transmits optical signals to some of the optical fibers and receives optical signals from other of the optical fibers. The flex-circuit assembly 48 includes a flexible substrate 49 that is well known in the art. The flexible substrate 49 is formed of flexible material, such as polyimide, and has an array of bond pads (not shown in FIG. 2) located on the portion of the carrying member 46 that is attached to horizontal mechanical support 52. The bond pads are used for connection to circuitry (not shown in FIG. 2) external to the carrying member 46 that provides signals and power for operating the optoelectronic element 54 and for operating related electronics mounted on the carrying member 46. The related electronics may be mounted at electronics mounting area 62. Conductive traces (not shown in FIG. 2) from the bond pads to the electronics mounting area 62 and the optoelectronic component 54 are used to conduct signals and power.

Various electronic components, such as resistors, capacitors, inductors, transistors, integrated circuits, and sub-assemblies including resistors, capacitors, inductors, transistors and integrated circuits, can be mounted on the flex-circuit assembly 48 to process the electrical signals transmitted to and received from the optoelectronic component 54. The actual processing applied to the electrical signals can depend on the application in which optical communication system 20 is used. For example, it is generally desirable to amplify the electrical signals generated by the optoelectronic component 54 in response to the optical signals received from the fiber cable 34. The embodiment shown in FIG. 2 may include an electronic circuit (not shown in FIG. 2) carried in the electronics mounting area 64, which may be an integrated circuit that amplifies the electrical signals generated by the optoelectronic component 54. The electronic circuit may also perform processing on the electrical signals in addition to amplification. The electronic circuit would be electrically connected to the flex-circuit assembly 48 through which it directly or indirectly receives the electrical signals from the optoelectronic component 54 as input signals. As well as being electrically connected to the flex-circuit assembly 48, such an electronic circuit preferably also would be mechanically and electrically coupled to the mechanical support 50. The mechanical supports 50 and 52 are preferably fabricated from a material, such as copper, that has high thermal conductivity. The conductivity enables the mechanical support to function as a heat sink for an electronic circuit. The mechanical supports may alternatively be fabricated from other materials having high thermal conductivity.

The carrying member 46 is configured for mounting on another circuit board (not shown in FIG. 2) by means of the motherboard mounting area 64. In an embodiment, the motherboard mounting area 64 includes a plurality of solder balls. A corresponding array of pads is located on the motherboard on which the carrying member 46 is mounted. When the carrying member 46 is mounted on the motherboard, the solder balls establish a strong mechanical bond and low impedance electrical connections between the device package and the motherboard. The carrying member 46 is mounted on the motherboard by placing the solder balls in contact with the respective pads on the motherboard and applying heat to melt the solder balls. The heat may alternatively melt a solder paste applied to the pads on the motherboard. When the molten solder cools and solidifies, it fixes the solder balls to the pads. The carrying member 46 also includes a carrying member-mating surface 66 arranged to mate with an alignment member-mating surface 70 (not shown in FIG. 2).

The flex-circuit assembly 48 includes the plurality of alignment openings 60. In one embodiment, two round alignment openings 60 are used that preferably extend through the flex-circuit assembly 48 and into or through the mechanical support 50. The centers of alignment openings 60 are separated by a predetermined distance, and the alignment openings have a diameter dimensioned to provide a loosely defined positional relationship with a respective alignment pin, such as the alignment pin 44 of FIG. 1. The dimensional relationship between the diameter of an alignment opening 60 and an alignment pin 44 will be further discussed below in reference to FIGS. 4 and 5. While the alignment openings 60 and alignment pins 44 are round, they may be any shape suitable for providing an active alignment. In an alternative embodiment, an alignment pin may have a plurality of diameters depending on its cross-sectional shape.

The optoelectronic component 54 may be any suitable optoelectronic device or an array of suitable optoelectronic elements such as lasers, including VCSELs, light emitting diodes (LEDs), and photodiodes, including PINs and PN diodes, capable of transmitting or receiving optical signals. Thus, optoelectronic component 54 can be selected from a broad range of photoactive devices capable of transmitting or receiving. The optoelectronic component 54 may be a combination of transmitting and receiving elements. In one embodiment, the optoelectronic component 54 comprises a 1×12 array of VCSELs for transmitting optical signals. In an alternative embodiment, the optoelectronic component 54 comprises a 1×12 array of PIN diodes for receiving optical signals. The optoelectronic component 54 may also accommodate additional electronic circuits that are directly or indirectly electrically connected to the optical communications system 20. For example, such electronic circuits may drive a VCSEL constituting one of the electro-optical elements of the optoelectronic component 54, or may amplify the electrical signal generated by a PIN constituting one of the electro-optical elements of the optoelectronic component 54.

The optoelectronic component 54 is electrically coupled to one or more of the conductive tracks (not shown in FIG. 2) on the flex-circuit assembly 48, and is mechanically mounted to either the flex-circuit assembly 48 or the mechanical support 50, or to both. In one embodiment, the ideal mounting position of the optoelectronic component 54 is a centered position between the centers of the holes 60. However, the actual mounting position of the optoelectronic component 54 in this embodiment can vary from the ideal mounting position by at least plus or minus 25 to 30 microns along either or both the X-axis and the Y-axis. This variation allows the active alignment described below in conjunction with FIGS. 4 and 5 to adjust for any variation. In an alternative embodiment, the variation between the actual mounting position and the ideal mounting position can be up to 100 microns. This variance tolerance is an improvement over the present art, which typically requires a maximum placement variation in the X- and Y-axis position of the optoelectronic component 54 of not more than five microns. The optoelectronic component 54 is positioned on the flex-circuit assembly 48 using any suitable vision-aided alignment process, including automated processes, and is mounted to the flex assembly 48. The Z-axis location of the optoelectronic component 54 is established by a mounting surface (not shown in FIG. 2) of the flex-circuit assembly 48.

Figure 3:
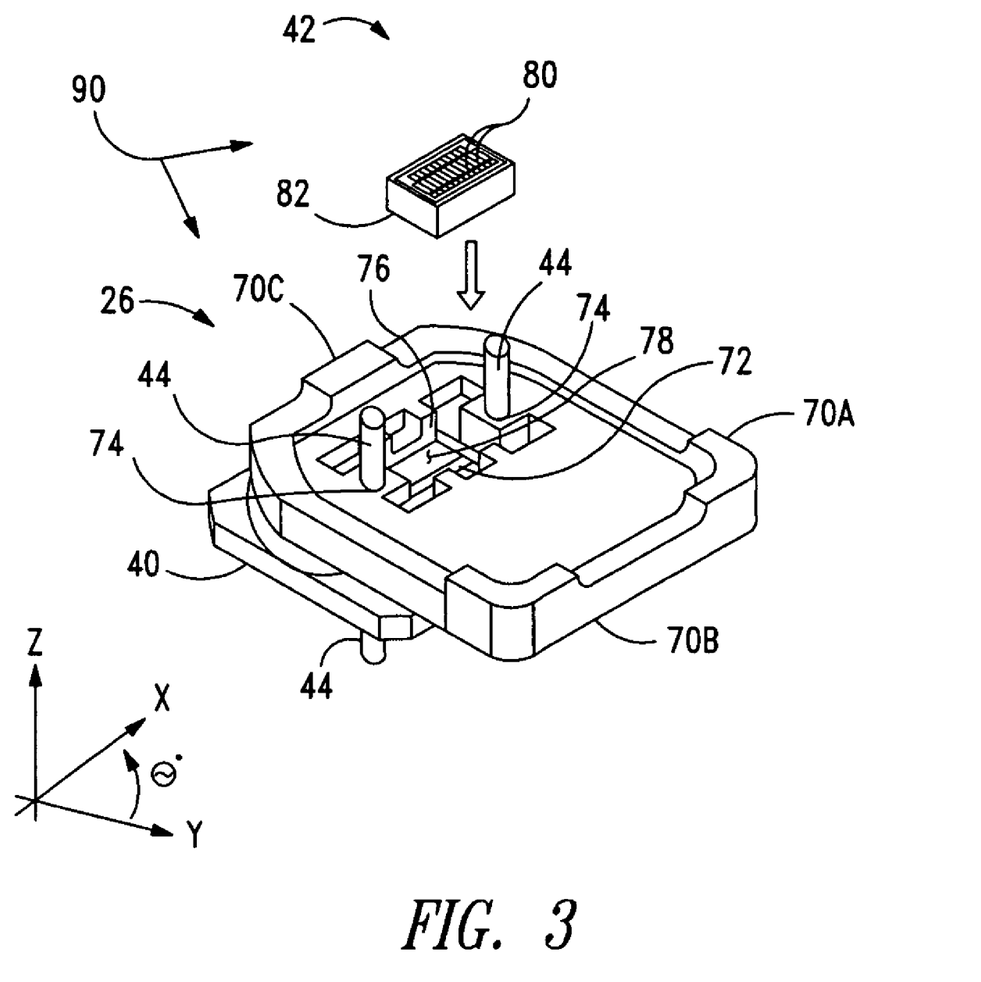
FIG. 3 is a perspective view of an alignment member and a lens array of FIG. 1 according to an embodiment of the invention.

FIG. 3 is an exploded view of the alignment member 26 and the lens array 42 of FIG. 1 according to an embodiment of the invention. The alignment member 26 includes a connector stop 40, a plurality of alignment pins 44, alignment member mating surfaces 70a–70c, a window 72, a plurality of alignment pin-mounting holes 74, a lens-mounting cavity 76, and a rectangular shoulder 78. Typically, the alignment member mating surfaces 70a–70c are coplanar, and there may be more or fewer than three such surfaces. The lens array 42 includes an array of lens elements 80, and a lens-mounting base 82.

The length and width of alignment member 26 are typically not critical. An embodiment was built having a length of 8.325 mm along the X-axis and 7.3 mm along the Y-axis. A function of the alignment member 26 is to carry the lens array 42 in an ideal mounting position relative to the plurality of alignment pin-mounting holes 74 (and the alignment pins 44 carried in the holes 74). In one embodiment, the actual mounting position of the lens array 42 can vary from the ideal mounting position by at least plus or minus 25 to 30 microns along either or both the X-axis and the Y-axis. In this embodiment, the ideal X- and Y-axis-mounting position of the lens array 42 is centered between the alignment pins 44. The alignment member 26 also carries the lens array 42 in a closely defined position along the Z-axis. The connector stop 40, the rectangular shoulder 78, and the mating surfaces 70a–70c are in planes parallel to the X-Y planes, and the distance between each is controlled with a tolerance of approximately 20 microns. The alignment member 26, its components, and its enablement are further described in U.S. application Ser. No. 09/738919, filed Dec. 15, 2000, Gallup, et al., Optical Systems for Z-Axis Alignment of Fiber, Lens and Source Arrays, which is incorporated herein by reference for all purposes. The window 72 is arranged in the alignment member 26 to allow passage of light between the lens array 42 and the ferrule 36 (FIG. 1).

Another function of the alignment member 26 is to rigidly carry the plurality of alignment pins 44. The alignment member 26 includes a plurality of alignment pin-mounting holes 74, each dimensioned for one alignment pin 44 to be rigidly mounted therein. The centers of alignment pin-mounting holes 74, and thus the centers of the pins 44, are separated by the or approximately the same predetermined distance as the alignment openings 60 of the carrying member 46 of FIG. 2. The alignment pins 44 are rigidly mounted in the holes 74, and the mounting may be by a force fit, bonding, or secured by any manner known in the art. Alternatively, the pins may be integral with the member 26. The alignment pins 44 have a length along the Z-axis extending beyond the alignment member-mating surfaces 70a–70c sufficient to be positioned within its corresponding alignment opening 60 at one end in the manner described below in conjunction with FIG. 4. The cross-sectional shape, diameter, and length of each pin 44 are arranged to provide a loosely defined position relative to the respective alignment opening 60. The alignment pins 44 have another length along the Z-axis extending beyond the connector stop 40 to be removably engaged in corresponding alignment openings (not shown) in the ferrule 36 of FIG. 1. This other length and its cross-sectional shape and diameter are arranged to provide a precisely defined position in the X-Y plane between the alignment member 26 and the ferrule 36.

The lens-mounting cavity 76 is or is approximately centered between the plurality of alignment pin-mounting holes 74. The cavity 76 is oversized along the X- and Y-axis to allow the lens array 42 to be moved for alignment along those axes.

A function of the lens array 42 is to focus the light between the optoelectronic component 54 and ends of the optical fibers in the ferrule 36 of FIG. 1. By using an array of either refractive or diffractive lenses as required by the particular application to form the array of lens 80, the beams of light from the optical fibers can be appropriately shaped and focused to improve the light coupling. This is particularly important in order to couple a beam from a VCSEL into a multimode optical fiber, with the modes of the fiber all being excited at the input end. Furthermore, by converging or focusing a light beam, loss of light at a photo receiver can be reduced when large core fibers are used. Focusing and divergence can be achieved by employing a diffractive optical element. The array lens elements 80 of the lens array 42 is preferably etched or molded into a glass or plastic base. Each of the lens elements 80 is arranged for alignment directly between an optoelectronic element of the optoelectronic device 54 (FIG. 2) and its associated optical fiber. The lens-mounting base 82 is arranged to mount the lens array 42 on the rectangular shoulder 78 of the cavity 76.

The lens array 42 is mounted in alignment member 26 to form an optical subassembly 90. In one embodiment, the ideal mounting position of the lens array 42 is centered between the alignment hole 74. The lens array 42 is aligned and mounted within the lens-mounting cavity 76 and on rectangular shoulder 78 using automated or semi-automated equipment in a manner similar to that used to mount the optoelectronic component 54 on the carrying member 46 (FIG. 1). The alignment holes 74 provide X- and Y-axis alignment information to the mounting equipment. The rectangular shoulder 78 establishes the Z-axis location. Because the cavity 76 is oversized relative to the size of lens array 42, the lens array 42 can be moved into X-Y alignment within the cavity 76. As discussed above, in one embodiment the actual mounting position can vary from the ideal mounting position by at least plus or minus 25 to 30 microns along either or both the X- and Y-axis. This is an improvement over the prior art, which typically limits the maximum X- and Y-axis variation to approximately five microns. The lens array 42 is fixated to the rectangular shoulder 78 in any suitable manner known in the art, including bonding with an epoxy adhesive.

Figures 4, 5:
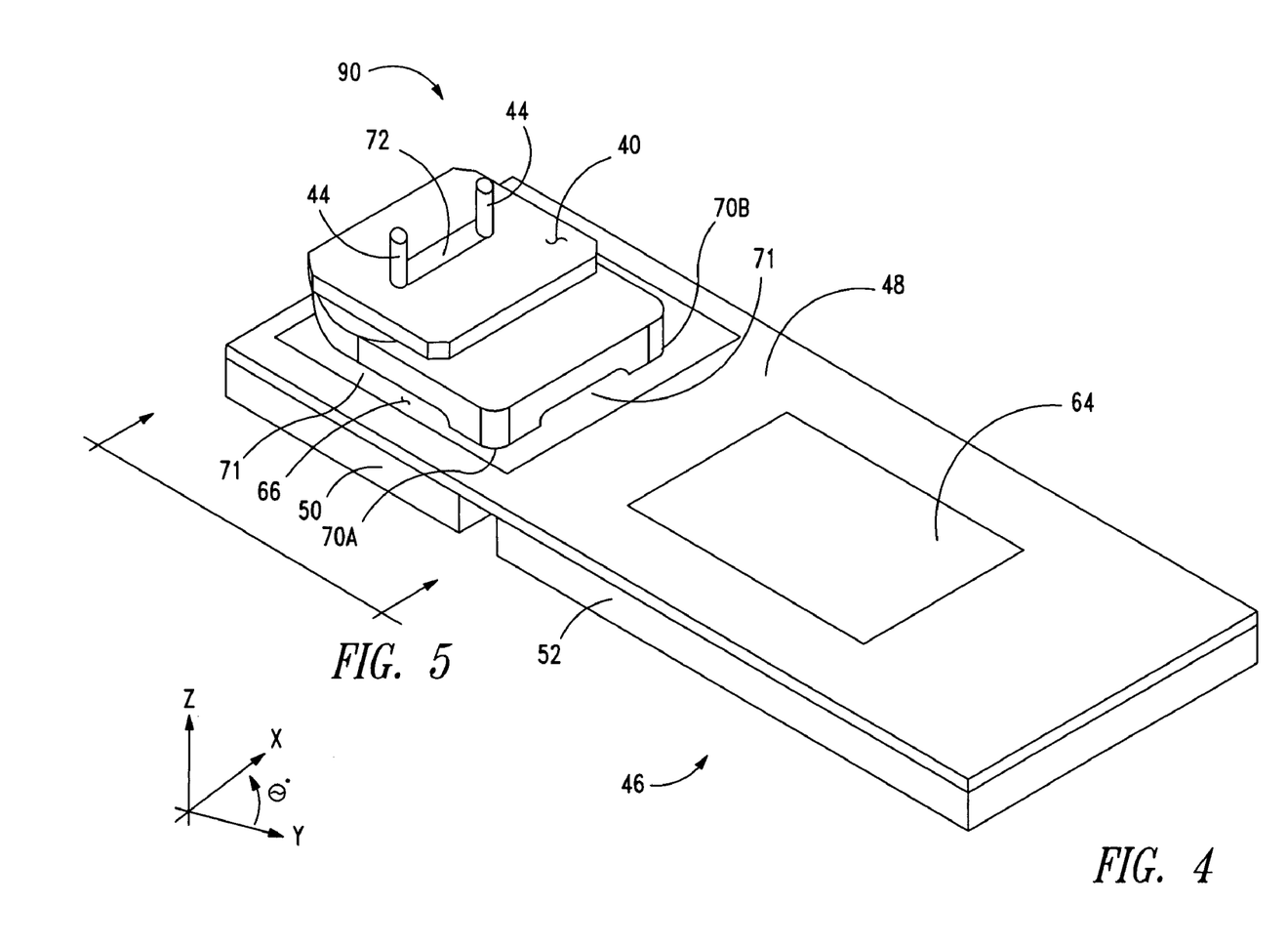
FIG. 4 is a perspective view of the carrying member and the optical subassembly with their respective mating surfaces in close proximity, and ready for active alignment.
FIG. 5 is a side view of the components of FIG. 4, and of a receptacle and the connector.
Figure 5:
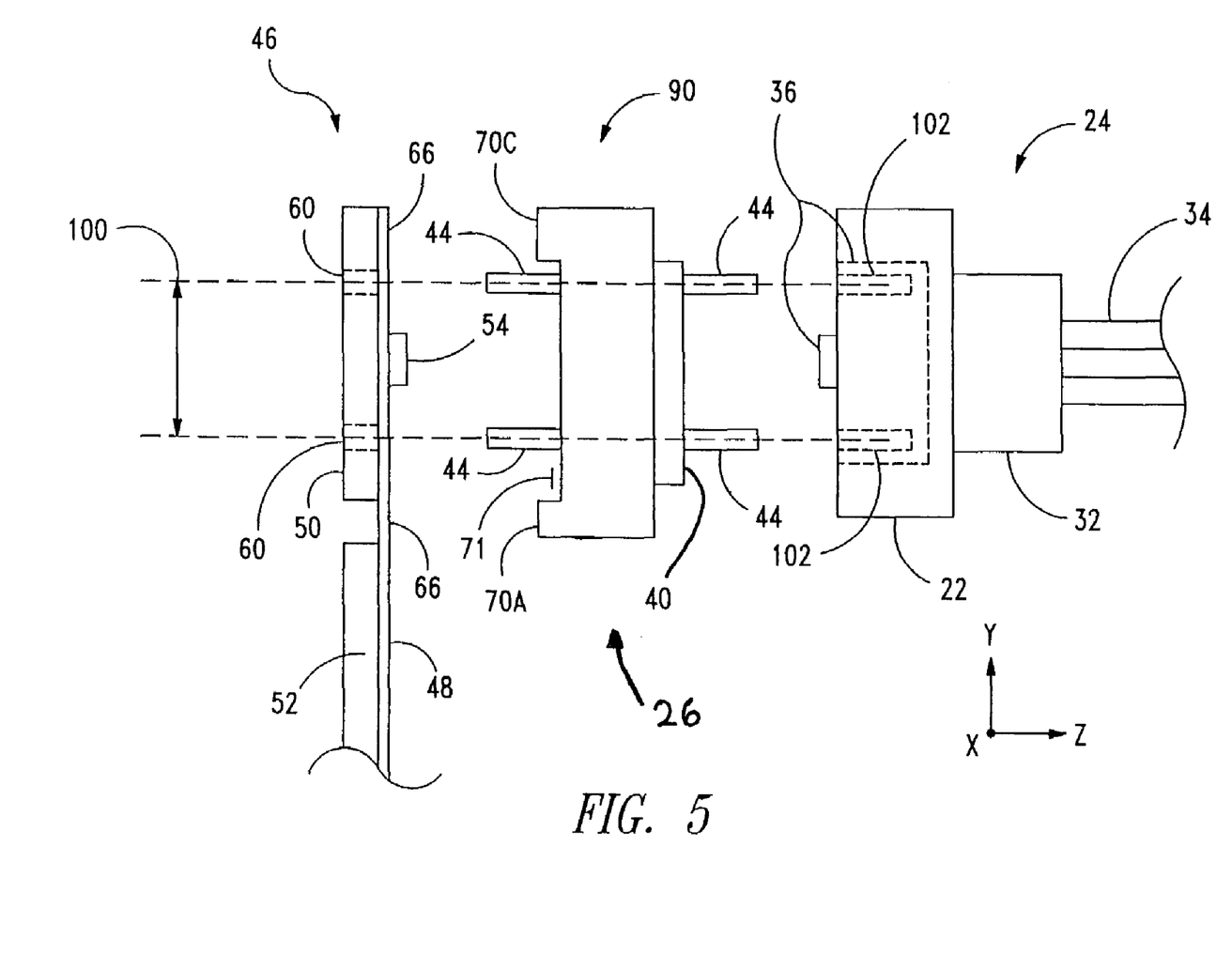

FIGS. 4 and 5 illustrate the active alignment of the carrying member 46 and the optical subassembly 90 according to an embodiment of the invention. FIG. 4 is a perspective view of the carrying member 46 and the optical subassembly 90 with their respective mating surfaces in close proximity, and ready for active alignment. FIG. 5 is a side view of the components of FIG. 4, and also illustrates the receptacle 22 and the connector 24. FIG. 4 illustrates the space for adhesive 71 formed when the mating surface 66 and the mating surfaces 70a–70c are brought in proximity. FIG. 5 illustrates the alignment of the components. Dimension 100 is a predetermined distance between the centers of the alignment openings 60 in the carrying member 46, the alignment pins 44, the plurality of alignment pin-mounting holes 74 (not shown), and the plurality of ferrule alignment openings 102. An embodiment of the optical communications system was built where the dimension 100 was 4.6 mm. The alignment pins 44 were round and had diameters of 900 microns, and the alignment openings 60 were round and had diameters of 1100 microns. The difference in diameters between alignment pins 44 and alignment openings 60 was 200 microns, providing an alignment range in both the X-axis and the Y-axis of 200 microns between optics subassembly 90 and the flex-circuit assembly 48. The alignment pin 44 diameters may be different, and the cross-section of the alignment pins 44 may be any shape suitable for the intended purpose of the application.

The present invention also provides an aligned guide pin 44 for connection with the customer's receptacle 22 and connector 24. The diameter of the ferrule alignment openings 102 are several microns larger than the alignment pins 44, providing a close fit that minimizes movement along the X-and Y-axis between the receptacle 22 and alignment member 26.

The following illustrates actively aligning the optoelectronic component 54 and the lens array 42. The active alignment will be described using an example in which the optoelectronic component 54 is a VCSEL. The initial rough alignment is performed by bringing together the optical subassembly 90 and the flex-circuit assembly 48 with the mounted optoelectronic component 54, with their corresponding mating surfaces 66 and 70 proximate, and with the alignment pins 44 positioned within their respective alignment openings 60. A test receptacle 22 and connector 24 are connected to the optical subassembly as illustrated in FIG. 5. The alignment pins 44 provide a loose alignment of the receptacle 22 and the connector 24 along the X-Y axis. A further step includes powering up the flex-circuit assembly 48 and the VCSEL (54). Another step uses a precision motion controller (not shown) to align the element at one end of the VCSEL array of elements with its corresponding lens element in the array of lens elements 80 (FIG. 3). The alignment includes moving the optical subassembly 90 along the X-axis and the Y-axis within the alignment range until an optimal optical coupling occurs for the channel being aligned. The optimal optical coupling is determined by the strength of the light signal received by the optical fiber serving that channel as measured by a test instrument (not shown) coupled to fiber cable 34.

Holding aligned X-Y position, the channel on the opposite end of the optoelectronic component is then aligned. The optical subassembly 90 is rotated in a theta direction until an optimal optical coupling occurs for the channel being aligned. When both channels on opposite ends of the optoelectronic component 54 are aligned, the channels lying between are also aligned. The same procedure is followed when the optoelectronic component 54 is a receiver, such as a PIN diode. The optimal optical coupling is determined by the strength of the light signal received by the PIN from the optical fiber serving that channel.

The actively alignment position is initially tacked in place by applying a light cure resin in a portion of the space 71, and then light curing the resin so the assembly is strong enough to move. Once the light cure resin has cured, an adhesive such as a structural epoxy is applied into space for adhesive 71. The assembly is oven cured to permanently fixate the actively aligned optoelectronic component 54 and the lens array 42 in the alignment having the optimal optical coupling.

The over sizing of the alignment openings 60 provides an advantage over prior art solutions using close fitting guide pins and openings to align a carrying member, such as member 46, with an optical subassembly, such as assembly 90. The prior art required that the VCSEL and the lens each be mounted to their carrying pieces within a very tight tolerance of about plus or minus five microns to the aligning pins. If this tight tolerance did not provide the proper alignment, the piece had to be discarded. Conversely, the disclosed active alignment device and technique allow the lens to be moved into alignment with the VCSEL. For example, if the optoelectronic component 54 is placed 20 microns away from its ideal location, the optical subassembly 90 can be moved 20 microns and positioned in optical alignment. Because in one embodiment, the alignment openings 60 are 200 microns oversized, either the optoelectronic component 54 or the lens array 42 only need to be placed within plus or minus 100 microns of their ideal locations and the assembly can still be used.

Although the present invention has been described in considerable detail with reference to certain preferred embodiments, other embodiments are possible. Therefore, the spirit or scope of the appended claims should not be limited to the description of the embodiments contained herein. It is intended that the invention resides in the claims hereinafter appended.

What is claimed is:

1. An optoelectronic device having an active alignment range, the device comprising:
    an alignment member having a lens-mounting portion, a first mating surface, and a plurality of alignment pins, each pin having a diameter, and the centers of the alignment pins being separated by a predetermined distance; and
    a carrying member having an optoelectronic component mounting portion, a second mating surface, and a plurality of alignment openings, each opening having an alignment opening diameter and further being arranged to correspond with an alignment pin, the centers of the openings being separated by the predetermined distance, and each opening diameter being greater than the pin diameter of the pin with which the opening corresponds,
    the active alignment range being provided by the difference between the opening diameter and the pin diameter of the pin with which the opening corresponds, the diameter difference being selected such that when the first mating surface is proximate to the second mating surface, and when the alignment pins are positioned within their corresponding alignment openings, a lens mounted on the alignment member and an optoelectronic component mounted on the carrying member can move relative to each other into an alignment.

2. The device of claim 1, wherein the alignment member further includes a connector stop cooperatively arranged with the alignment pins to provide an aligned coupling between a connector having at least one optical fiber and the optoelectronic component.

3. The device of claim 2, where alignment of the aligned coupling in the plane perpendicular to an optical path between the lens and the optical fiber is provided by the alignment pins, and alignment of the aligned coupling in a direction parallel to the optical path is provided by the connector stop.

4. The device of claim 1, where the alignment pins extend longitudinally beyond both the first mating surface of the alignment member.

5. The device of claim 1, wherein the diameter of the alignment opening is at least 5 microns greater than the diameter of the corresponding alignment pin.

6. The device of claim 1, wherein the diameter of the alignment opening is between 5 and 200 microns greater than the diameter of the alignment pin.

7. The device of claim 1, wherein the lens-mounting portion includes a planar surface to carry a lens, and the first mating surface includes a planar surface that is parallel to the planar surface of the lens-mounting portion.

8. The device of claim 1, wherein the alignment member includes an optical path.

9. The device of claim 1, wherein the optoelectronic component includes a vertical cavity surface emitting laser.

10. The device of claim 1, wherein the lens is a diffractive lens.

11. The device of claim 1, wherein the optoelectronic component includes a photo-intrinsic diode.

12. The device of claim 1, wherein the lens is a refractive lens.

13. An actively aligned optoelectronic module comprising:
   an optoelectronic device having an active alignment range, the device comprising:
      an alignment member having a lens-mounting portion, a first mating surface, and a plurality of alignment pins, each pin having a diameter, and the centers of the alignment pins being separated by a predetermined distance;
      a carrying member having an optoelectronic component mounting portion, a second mating surface, and a plurality of alignment openings, each opening having an alignment opening diameter, and further being arranged to correspond with an alignment pin, the centers of the openings being separated by the predetermined distance, and each opening diameter being greater than the pin diameter of the pin with which the opening corresponds,
      the active alignment range being provided by the difference between the opening diameter and the pin diameter of the pin with which the opening corresponds, the diameter difference being selected such that when the first mating surface is proximate to the second mating surface, and when the alignment pins are positioned within their corresponding alignment openings, a lens mounted on the alignment member and an optoelectronic component mounted on the carrying member can move relative to each other into an alignment; and
      a connector stop carried on the alignment member that is cooperatively arranged with the first and second alignment pins to provide an aligned, removable optical fiber to lens coupling;
   a lens carried on the lens-mounting portion of the alignment member; and
   an optoelectronic component carried on the carrying member.

14. A method of providing an actively aligned optoelectronic module, the method comprises the steps of:
   mounting a lens on an alignment member, the alignment member including a plurality of alignment pins, each alignment pin having a diameter, and the centers of the alignment pins being separated by a predetermined distance;
   mounting an optoelectronic component on a carrying member, the carrying member including a plurality of alignment openings arranged to correspond to the alignment members, each opening having an diameter, the centers of the openings being separated by the predetermined distance, and the alignment opening diameters being greater than the corresponding pin diameters;
   placing the mounted optoelectronic component and the mounted lens in optical proximity to each other, and positioning the first alignment pin within the first alignment opening and the second alignment pin within the second alignment opening, where the difference between the first diameter and the first alignment opening diameter, and the difference between the second diameter and the second alignment opening diameter, provide an alignment range; and
   moving the mounted optoelectronic component relative to the mounted lens into an alignment of maximum optical coupling.

15. The method of claim 14, further including the further step of fixating the mounted optoelectronic component relative to the mounted lens in the alignment.

16. The method of claim 14, wherein the alignment provides optimal optical coupling between the mounted optoelectronic component and the mounted lens.

17. An optoelectronic device having an active alignment range, the device comprising:
   an alignment member having a lens-mounting portion, and a means for aligning with a carrying member; and
   the carrying member having an optoelectronic component mounting portion, and a corresponding means for aligning with the alignment member,
   the means for aligning with a carrying member and the means for aligning with the alignment member being arranged to mate in a first configuration that provides a loose alignment, and to mate in a second configuration that provides a selected alignment, the second configuration providing a selected alignment of maximum optical coupling of an optoelectronic component mounted on the carrying member with a lens mounted on the alignment member.

18. The optoelectronic device of claim 17, further comprising a means for fixating the alignment member and the carrying member in the selected alignment.

* * * * *